United States Patent [19]

Tanaka et al.

[11] Patent Number: 5,494,300
[45] Date of Patent: Feb. 27, 1996

[54] SEALING MEMBER

[75] Inventors: Tadashi Tanaka, Konan; Hidehiko Tamura, Aichi; Nobutaka Hiramatsu, Ichinomiya; Toshio Egami, Aichi, all of Japan

[73] Assignee: Daido Metal Company Ltd., Nagoya, Japan

[21] Appl. No.: 243,400

[22] Filed: May 16, 1994

[30] Foreign Application Priority Data

May 31, 1993 [JP] Japan .................................. 5-129482

[51] Int. Cl.⁶ ............................................. F16J 15/32
[52] U.S. Cl. ................................. 277/227; 277/235 R
[58] Field of Search .............................. 277/227, 235 R, 277/DIG. 6, 96, 96.2

[56] References Cited

U.S. PATENT DOCUMENTS

| | | |
|---|---|---|
| 4,050,701 | 9/1977 | Webb . |
| 4,056,594 | 11/1977 | Carrow ..................................... 264/176 |
| 4,703,076 | 10/1987 | Mori ......................................... 524/420 |
| 5,363,569 | 11/1994 | Kadakia ..................................... 34/601 |

OTHER PUBLICATIONS

NTN Rulon KK; Abstract 92–027507/04 and Japan 3273083, Apr. 12, 1991.

Shinetsu Polymer; Abstract 89–343313/47 and Japan 1254766, Nov. 10, 1989.

*Primary Examiner*—Daniel G. DePumpo
*Attorney, Agent, or Firm*—Browdy and Neimark

[57] ABSTRACT

A sealing member prepared by molding a material for the sealing member, comprising a PAN series carbon fiber, a polytetrafluoroethylene resin and a polyphenylene sulfide resin. It has an excellent low friction property and sealing characteristics and is less liable to damage a counter member. In particular, it is useful as a sealing member for a scroll type compressor.

9 Claims, 1 Drawing Sheet

SEALING MEMBER

BACKGROUND OF THE INVENTION

The present invention relates to a sealing member which has excellent low friction properties and sealing characteristics and is less liable to damage a counter member. In particular, this sealing member is useful as a sealing member for a scroll type compressor.

The scroll type compressor, in which a spiral wall is provided on one face of a scroll member substrate, compresses fluid by allowing the respective scroll members on a fixed side and a moving member to claw with each other and rotate in a decentering status at the spiral wall. A tip seal is inserted at bottom of a spiral groove, and it is known that sealing characteristics and sliding characteristics of this tip seal are closely related to operational efficiency.

Conventional materials for preparing a sealing member include thermoplastic resins such as polyether ether ketone and polyphenylene sulfide and the materials obtained by adding a fluorocarbon polymer, a pitch series carbon fiber and organic powder to a polyphenylene sulfide resin.

Such materials enable injection molding to be used to increase production and thus reduce costs. However, in the case where the conventional sealing members prepared by molding the above materials are used under recent applied conditions which have become more severe as compared with previously, particularly under high loads, the conventional sealing members are not sufficiently satisfactory due to inferior frictional characteristics, excessive shrinkage, and damage to the counter member.

SUMMARY OF THE INVENTION

The present invention has as an object to provide a sealing member for which the excellent characteristics of a polyphenylene sulfide resin and a PAN (polyacrilontrile) series carbon fiber are applied so that damage to a counter member does not occur and which sealing member excels in frictional characteristics and sealing characteristics and can be used under conditions of a high load.

The present invention is to meet the above objects, and the essentials thereof are:

(1) a sealing member prepared by molding a material for the sealing member, comprising a PAN series carbon fiber, a polytetrafluoroethylene resin and a polyphenylene sulfide resin, (2) a sealing member prepared by molding the said material wherein the contents of the PAN series carbon fiber and the polytetrafluoroethylene resin in the material are 5 to 20 weight % and 1 to 15 weight %, respectively, and (3) a sealing member further comprising 0.1 to 10 weight % of metallic compound powder in above (1).

DETAILED DESCRIPTION OF THE INVENTION

Figure 1:
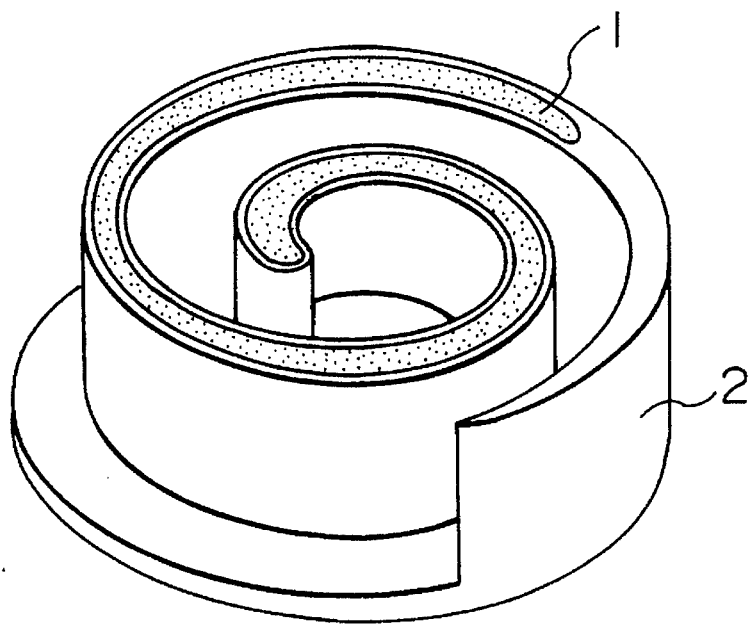
FIG. 1 shows a perspective view of a scroll member.
Figure 2:
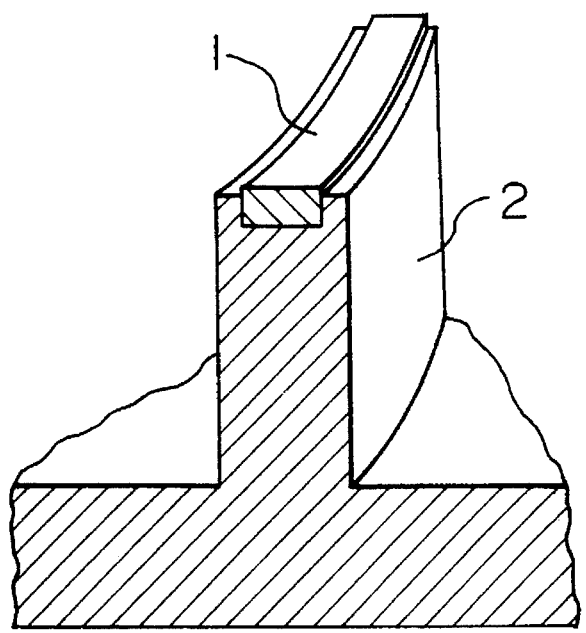
FIG. 2 shows sectional view of the scroll member, wherein 1 shows a sealing member and 2 shows the scroll member.

Polyphenylene sulfide (hereinafter referred to as PPS) used in the present invention is a crystalline PPS having a repeating unit represented by Formula (1) and is preferably a polymer containing the above repeating unit of 70 mole % or more, particularly 90 mole % or more. A case where the repeating unit is less than 70 mole % is not preferred because its heat resistance is lowered.

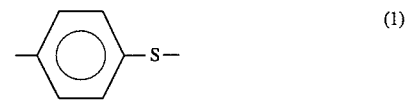
(1)

Further, in addition to the recurring unit (1), the repeating units of following (2) to (8) can be incorporated into the PPS in an amount less than 30 mole %.

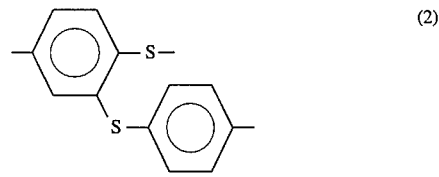
(2)

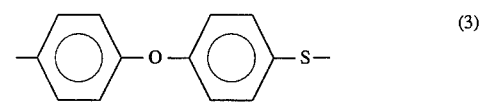
(3)

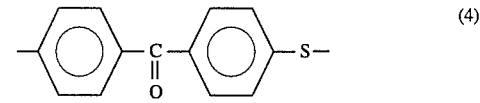
(4)

(5)

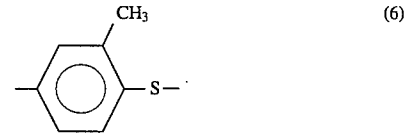
(6)

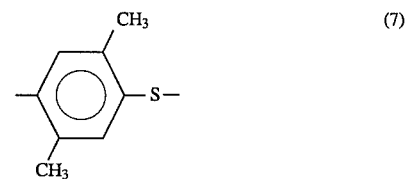
(7)

(8)

PPS is generally manufactured by the method described in Japanese Patent Application Kokai No. 45-3368 and is commercially available. These include a crosslinking type and a linear type, and those of any types can be used for the present invention.

In particular, the PAN (polyacrilonitrile) series carbon fiber is used as a carbon fiber in the composition of the present invention. The PAN series carbon fiber has excellent frictional characteristics and reveals an excellent effect of not damaging a counter member as compared with a conventional pitch series carbon fiber. Further, decreasing the amount of shrinkage in a product in molding can improve the sealing properties as well.

The PAN series carbon fiber in the present invention has preferably a length of 1 mm or shorter. The length exceeding 1 mm deteriorates fluidity in melting to make molding difficult.

There are used as commercially available PAN series carbon fiber, Torayca MLD-3, Torayca MLD-300 and Torayca MLD-1000 each manufactured by Toray Co., Ltd. and Besfight HTA-CMF-0040-E, Besfight HTA-CMF-0160-E and Besfight HTA-CMF-1000-E each manufactured by Toho Rayon Co., Ltd.

A content of the PAN series carbon fiber in the composition (material) for the sealing member of the present invention resides preferably in a range of 5 to 20 weight %, more preferably 10 to 15 weight %. The content less than 5 weight % reduces an improving effect in load carrying capacity, anti-friction characteristics and creep characteristics. Meanwhile, that exceeding 20 weight % damages a counter member and deteriorates sealing characteristics.

Polytetrafluoroethylene (hereinafter referred to as PTFE) in the composition of the present invention has preferably an average powder size of 25 μm, and there are used as a commercially available one, TLP10F-1, TLP10 and MP1300 all manufactured by Mitsui DuPont Fluorochemical Co., Ltd., Lubron L-5 and L-2 manufactured by Daikin Ind. Co., Ltd. and TL-500F manufactured by Kitamura Co., Ltd.

A content of PTFE usually resides in a range of 1 to 15 weight %, more preferably 5 to 10 weight %. A content less than 1% reduces improvement in sliding characteristics and anti-seizure characteristics. Meanwhile, that exceeding 15 weight % weakens the strength of a resin composition to cause reduction in anti-friction characteristics, load carrying capacity and anti-creep characteristics. Further, it increases the amount of shrinkage in molding a product to deteriorate sealing characteristics.

In the present invention, addition of metallic compound powder of 0.1 to 10 weight % can furthermore improve the load carrying capacity and the anti-friction characteristics. In particular, a Pb compound such as Pb, $PbF_2$ and PbS is preferred as metallic compound powder. A content of 0.1% or less does not provide any added effect and that exceeding 10% deteriorates an injection molding property.

According to the sealing member of the present invention for a scroll type compressor, use of PAN series carbon fiber as a component of the material for the sealing member can improve sliding characteristics and sealing characteristics. Further, a problem of damaging a counter member to a sealing member can be solved and an excellent performance can be seen as well as use under conditions recent high loads.

DESCRIPTION OF THE PREFERRED EMBODIMENT

The raw materials used in the examples of the invention and the comparative examples are shown below:

(1) PSS: Ryton P-4 manufactured by Phillips Co., Ltd.

(2) PTFE: Lubron L-5 manufactured by Daikin Ind. Co., Ltd.

(3) PAN series carbon fiber: Torayca Mild Fiber MLD-300 manufactured by Toray Co., Ltd.

(4) Pitch series carbon fiber: Kureha M201F manufactured by Kureha Chemical Co., Ltd.

(5) Aramide fiber: Technora T-320 manufactured by Teijin Co., Ltd.

(6) Metallic compound powder: manufactured by Hashimoto Kasei Co., Ltd. (−350 mesh).

(7) Organic powder (oxybenzoyl polyester): Ekonol E101M manufactured by Sumitomo Chemical Ind. Co., Ltd.

The above raw materials (1) to (7) were mixed in the proportions shown in Table 1 and dry-blended by a Honschel mixer. Then, an extruding operation was carried out while melting and kneading them with a 40 mm diameter extruder (an extruding temperature: 310° C.) to obtain uniformly mixed pellets.

Next, these pellets were molded with a conventional injection molding machine at a cylinder temperature of 300° to 330° C. and a die temperature of 140° C. to thereby obtain the products of the invention (Sample No. 1 to 4) and the comparative products (Sample No. 5 to 11).

Friction and wear characteristics, counter member damage, heat efficiency, and amount of shrinkage in a product of the materials obtained in the above examples were measured. The test results thereof are shown in Table 3. The test conditions for the friction and wear characteristics are shown in Table 2.

TABLE 1

| | Materials for the sealing member | | | | | | | | | | |
|---|---|---|---|---|---|---|---|---|---|---|---|
| | Materials of the invention | | | | Comparative materials | | | | | | |
| Example No. | 1 | 2 | 3 | 4 | 5 | 6 | 7 | 8 | 9 | 10 | 11 |
| PPS | 65 | 75 | 94 | 70 | 65 | 85 | 60 | 89 | 75 | 75 | 70 |
| PTFE | 15 | 10 | 1 | 10 | 10 | | 25 | 10 | 10 | 10 | 10 |
| PAN series carbon fiber | 20 | 15 | 5 | 15 | 25 | 15 | 15 | 1 | | | |
| Pitch series carbon fiber | | | | | | | | | 15 | | 15 |
| Aramide fiber | | | | | | | | | | 15 | |
| Metallic compound powder | | | | 5 | | | | | | | |
| Organic powder | | | | | | | | | | | 5 |

TABLE 2

| Test Conditions | |
|---|---|
| Test machine used | Suzuki type friction & wear test machine |
| Dimension of material tested | ⌀25.6 × ⌀20 (thrust washer) |
| Load | 1.96 MPa (20 kgf/cm²) |
| Circumferential speed | 2.5 m/s |
| Test time | 4 hours |
| Lubricant | Suniso 4GS |
| Lubrication temperature | 100° C. |
| Counter material | AC8C |

TABLE 3

| | Test Results | | | | | | | | | | |
|---|---|---|---|---|---|---|---|---|---|---|---|
| | Sealing members the invention | | | | Comparative sealing members | | | | | | |
| Example No | 1 | 2 | 3 | 4 | 5 | 6 | 7 | 8 | 9 | 10 | 11 |
| Frictional coefficient | 0.04 | 0.04 | 0.07 | 0.04 | 0.05 | 0.10 | 0.04 | 0.05 | 0.07 | 0.05 | 0.07 |
| Wear amount (μm) | 20 | 24 | 30 | 17 | 88 | 35 | 56 | 91 | 32 | 78 | 30 |
| Counter member damage (μm) | 0.2 | 0.0 | 0.1 | 0.0 | 1.1 | 0.7 | 0.1 | 0.0 | 1.8 | 0.1 | 1.5 |
| Heat efficiency (%) | 99.6 | 100 | 99.8 | 100 | 93.5 | 93.1 | 98.1 | 96.7 | 92.6 | 97.8 | 93.9 |
| Amount of shrinkage (μm) | 5.0 | 4.7 | 4.2 | 4.9 | 4.8 | 4.1 | 7.8 | 11.1 | 7.2 | 8.7 | 7.2 |

As apparent from the test results shown in Table 3, the sealing members which are balanced in frictional coefficient, counter member damage, heat efficiency, and amount of shrinkage can be obtained according to the present invention. The effects of the present invention in which PAN series carbon fiber was used as a component of the material for the sealing member in place of the pitch series carbon fiber are obvious from a comparison of the examples No. 2 and 9 in Table 3.

The effect (amount of shrinkage) of a specific composition ratio of PTFE is obvious from a comparison of the examples No. 2 and 7 in Table 3. The effect (counter member damage) of a specific composition ratio of PAN series carbon fiber is obvious from a comparison of the examples No. 2 and 5 in Table 3.

What is claimed is:

1. A sealing member prepared by molding a material for the sealing member, comprising a polyacrilonitrile series carbon fiber, a polytetrafluoroethylene resin and a polyphenylene sulfide resin, wherein the contents of the polyacrilonitrile series carbon fiber and the polytetrafluoroethylene resin in the material for the sealing member are 5 to 20 weight % and 1 to 15 weight %, respectively.

2. The sealing member of claim 1, wherein the polyacrilonitrile series carbon fiber has a length of 1 mm or shorter.

3. The sealing member of claim 1, wherein the polytetrafluoroethylene resin has an average powder size of 25 μm or less.

4. The sealing member of claim 1, wherein the sealing member is a sealing member for a scroll type compressor.

5. The sealing member of claim 1, wherein the material for the sealing member further comprises 0.1 to 10 weight % of metallic compound powder.

6. The sealing member of claim 1, wherein the balance in the material for the sealing member is substantially the polyphenylene sulfide resin.

7. The sealing member of claim 5, wherein the metallic compound powder is a Pb compound.

8. The sealing member of claim 5, wherein the metallic compound powder is at least one Pb compound selected from a group consisting of PbO, $PbF_2$ and PbS.

9. The sealing member of claim 5, wherein the balance in the material for the sealing member is substantially the polyphenylene sulfide resin.

* * * * *